US008479840B2

(12) United States Patent
Hartmann

(10) Patent No.: US 8,479,840 B2
(45) Date of Patent: Jul. 9, 2013

(54) ELECTRIC TOOL

(75) Inventor: Axel Hartmann, Neuhausen (DE)

(73) Assignee: AEG Electric Tools GmbH, Winnenden (DE)

( * ) Notice: Subject to any disclaimer, the term of this patent is extended or adjusted under 35 U.S.C. 154(b) by 452 days.

(21) Appl. No.: 12/621,562

(22) Filed: Nov. 19, 2009

(65) Prior Publication Data

US 2010/0132968 A1 Jun. 3, 2010

(30) Foreign Application Priority Data

Nov. 28, 2008 (DE) ........................ 10 2008 059 599

(51) Int. Cl.
*H02K 9/06* (2006.01)

(52) U.S. Cl.
USPC ............................ 173/168; 173/217; 173/109

(58) Field of Classification Search
USPC .......................................... 173/168, 109, 217
See application file for complete search history.

(56) References Cited

U.S. PATENT DOCUMENTS 2,155,082 A * 4/1939 Decker ........................ 173/217
2,233,829 A * 3/1941 Blackwell ...................... 310/47
3,003,073 A * 10/1961 Bixler et al. .................... 310/59
3,818,255 A 6/1974 Wagner
3,829,721 A * 8/1974 Rosenthal, Jr. ................. 310/47
3,829,722 A * 8/1974 Rosenthal et al. .............. 310/50
4,120,616 A * 10/1978 Dwyer et al. ................ 417/373
5,006,740 A * 4/1991 Palm ............................... 310/50
5,182,482 A * 1/1993 Burke ............................. 310/89
5,188,508 A * 2/1993 Scott et al. .................... 415/206
5,311,089 A * 5/1994 Stroetgen et al. ............... 310/50
5,315,193 A 5/1994 Kummer et al.
5,343,101 A * 8/1994 Matani ............................ 310/58
5,363,815 A * 11/1994 Pretzsch et al. .............. 123/41.7
5,580,302 A * 12/1996 Howard et al. ............... 451/357
5,614,774 A * 3/1997 McCallops et al. ............. 310/58
5,747,900 A * 5/1998 Nakamura et al. .............. 310/58
6,043,575 A 3/2000 Ghode et al.
6,144,121 A * 11/2000 Ishida et al. .................... 310/50
6,198,195 B1 * 3/2001 Embree et al. ............ 310/254.1

(Continued)

FOREIGN PATENT DOCUMENTS

EP 0794038 9/1997
EP 0873824 10/1998
EP 1541293 6/2005
EP 1970162 9/2008

OTHER PUBLICATIONS

European Search Report dated Jan. 26, 2010 for EP 09174829.3.

*Primary Examiner* — Brian D Nash
(74) *Attorney, Agent, or Firm* — Carlson, Gaskey & Olds, P.C.

(57) ABSTRACT

An electrical tool (1) includes an electric motor (3), a fan wheel (4) that is connected in torque-proof manner to a drive shaft (8) of the electric motor (3) disposed within a housing (2) that includes at least one air inlet aperture (6) and at least one air outlet aperture (7). The at least one air outlet aperture (7) is arranged axially apart from the fan wheel (4) with regard to the axis of rotation (10) of the drive shaft (8). An air guide baffle ring (11) encloses the fan wheel (4) coaxially and has at least one air duct (12) which leads to at least one air outlet aperture (7) located axially at a distance from the fan wheel (4) for cooling the electric tool (1).

17 Claims, 5 Drawing Sheets

U.S. PATENT DOCUMENTS 6,239,521 B1 * 5/2001 Lee ................................ 310/62
6,600,249 B2 * 7/2003 Nelson et al. .................. 310/91
6,827,157 B2 * 12/2004 Fuchs .......................... 173/217
6,914,355 B2 * 7/2005 Cardenas et al. .............. 310/58
6,927,511 B2 * 8/2005 Cleanthous et al. ........... 310/58
7,064,462 B2 * 6/2006 Hempe et al. .................. 310/50
7,152,695 B2 * 12/2006 Happ et al. .................... 173/217
7,166,939 B2 * 1/2007 Voigt et al. ..................... 310/47
7,171,997 B2 * 2/2007 Nishikawa et al. ...... 144/136.95
7,374,399 B2 * 5/2008 Grinbergs ..................... 415/206
7,459,819 B2 * 12/2008 Finkenbinder et al. ......... 310/91
2003/0111918 A1 * 6/2003 Nishikawa et al. ............. 310/89
2005/0074332 A1 * 4/2005 Adamski et al. ........... 415/211.1
2009/0126964 A1 * 5/2009 Schroeder et al. ............ 173/217
2009/0322166 A1 * 12/2009 Satterfield et al. .............. 310/50

* cited by examiner

ELECTRIC TOOL

REFERENCE TO RELATED APPLICATION

This application claims priority to German Patent Application No. 102008059599.3-15 filed Nov. 28, 2008.

BACKGROUND

The present disclosure relates to an electrical tool, particularly a hand-operated electrical tool such as a drill or hammer drill.

An electrical tool of such kind is usually equipped with an electric motor. A drive shaft of the electric motor may be connected in fixed manner to a fan wheel in order to dissipate the heat generated in the electric motor when the electrical tool is operated. A housing that accommodates the electric motor and the fan wheel is furnished with at least one air inlet aperture and at least one air outlet aperture. When the electrical tool is being operated, the fan wheel is then able to generate a flow of cooling air that passes from the respective air inlet aperture and through the housing to the respective air outlet aperture. Besides exposing the electric motor to a flow of cooling air, this arrangement enables cool air to pass over other heat-sensitive components of the electrical tool, such as a gearbox, which accelerates or slows the rotating speed of the drive shaft to match the speed for example of a working spindle of the electrical tool.

SUMMARY

The present invention addresses the problem of suggesting an improved design for an electrical tool of the type described in the introduction, and that is characterized in particular in that it embodies an improved cooling arrangement.

The disclosed electric tool includes an air guide baffle ring in the housing to guide cooling air from the fan wheel to at least one air outlet aperture. The air guide baffle ring is located separately from the fan wheel in the direction of the axis of rotation of the drive shaft. The at least one air duct of the air guide baffle ring enables the cooling air to be transported against a relatively weak flow resistance.

The at least one air duct may advantageously be conformed, and particularly optimized, according to aerodynamic principles. The volume flow of the exhaust air may be increased by reducing the flow resistance to the exhaust air that is being conveyed by the fan wheel to the at least one air outlet aperture. However, this is accompanied by the increased volume flow of the intake air that is drawn in towards the fan wheel from the at least one air inlet aperture. Thus, the flow of cooling air transported may be increased overall, with a resulting improvement in cooling performance.

The air guide baffle ring also makes it possible to position air outlet apertures at an axial distance from the fan wheel, because with weak flow resistance the at least one air duct is able to conduct the air flow from the fan wheel as far as the at least one air outlet aperture. Accordingly, new possibilities and capabilities become available for the design of both the housing and the electrical tool, since it is no longer necessary to arrange the air outlet aperture one the same level axially as the fan wheel in order to be able to achieve a low flow resistance while maintaining adequate volume flow. Using the air guide baffle ring enables the design of the electrical tool to be simplified. In particular, its construction may be more compact, because it is then possible to position the air outlet aperture and the fan wheel with axial separation.

According to an embodiment, multiple air outlet apertures may be provided in the housing, and in particular may be offset axially relative to each other in the housing. The air guide baffle ring may now include multiple air ducts, which lead to different air outlet apertures, and in particular also to the air outlet apertures that are offset axially. This modification also results in improved cooling, because multiple air outlet apertures in different locations may be reached via the air ducts, while the flow resistance may still be kept low. Since the air ducts of the air guide baffle ring make it possible to reach several air outlet apertures in various locations, further options are created for positioning air outlet apertures of such kind on the housing. This increases freedom in the design of the electrical tool. In turn, it becomes easier to ensure an adequate flow of cooling air in the electrical tool. The total usable venting diameter may be increased because appropriately arranged air ducts enable more air outlet apertures of different kinds. This configuration may also contribute to reducing the flow resistance on the exhaust side. The directed air flow may also be used to cool parts of a gearbox in the electrical tool. Air flow may be directed axially to such an extent that a part of the air flow is directed through the entire gearbox and does not escape from the device or housing until it reaches a front end area of the electrical tool, e.g. close to a tool or drill chuck.

To achieve the aerodynamic optimization associated with reduced flow resistance, the respective air duct may have a tangential inlet area facing the fan wheel and a radial outlet area assigned to the respective air outlet aperture.

Another embodiment includes an outside contour of the air guide baffle ring that fits an inner contour of the housing in the area of the air guide baffle ring or of the fan. This enables the air guide baffle ring to match the shape of the housing in which it is installed. This in turn makes it easier to install and position the air guide baffle ring immovably inside the housing.

In order to improve the flow rate of the fan wheel on the exhaust side, which necessarily increases the cooling air volume flow and thus also cooling capacity, other measures may be implemented instead of or in addition to those cited, and in any combination. For example, the air guide baffle ring may coaxially enclose a fan wheel space in which the fan wheel is located. The respective air duct or ducts communicate with this fan wheel space on the inlet side. The geometry of the fan wheel space may be adapted to the radial outer contour of the fan wheel. For example, the fan wheel space includes a plurality of cylinder wall sections that form a relatively small radial gap between themselves and the fan wheel. In this way, most if not all of the cooling air is transported away through the air ducts arranged circumferentially between the cylinder wall sections, while only a small fraction of the air is directed through the annular gap in the radial direction. The air guide baffle ring may also have an annular base enclosing a central inlet that communicates with the fan wheel space and at least partially overlaps the fan wheel radially. Because of this annular base, supply air that flows into the fan wheel space and fan wheel via the central inlet is not able to return to the supply air side when it has been forced outside into the area of the base through the fan wheel. The base thus blocks or prevents the air from flowing back, thus improving the flow rate of the fan wheel. A cap may also be provided to limit the fan wheel space axially on a side facing away from the base. This cap, through which in particular the drive shaft may pass, may also serve to block or prevent false air flows escaping axially from the fan wheel and fan wheel space, thereby improving the radial flow rate of the fan wheel as well as the displacement of cooling air through the at least one air duct. This too ultimately increases the volume of the cooling air flow.

Of course, all of the features that have been described, as well as those that will be explained below, may be implemented not only in the combinations described for each, but also in other combinations or alone without thereby departing from the parameters of the invention.

Example embodiments of the invention are represented in the drawings and will be explained in greater detail in the following description, in which identical or similar or functionally equivalent parts are designated with the same reference number. These and other features disclosed herein can best be understood from the following specification and drawings, the following of which is a brief description.

DETAILED DESCRIPTION

Figure 1:
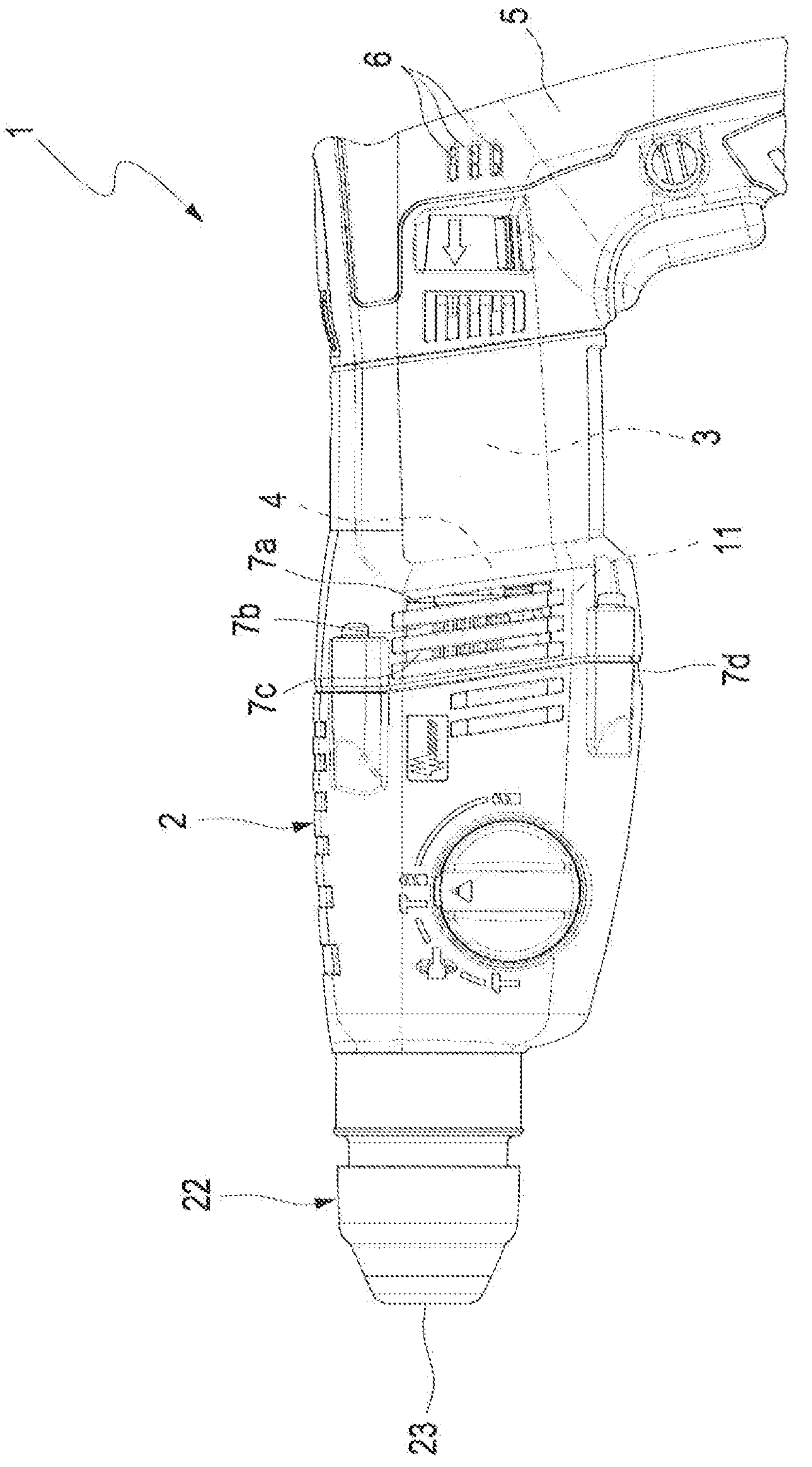
FIG. 1 is a side view of an electrical tool.
Figure 2:
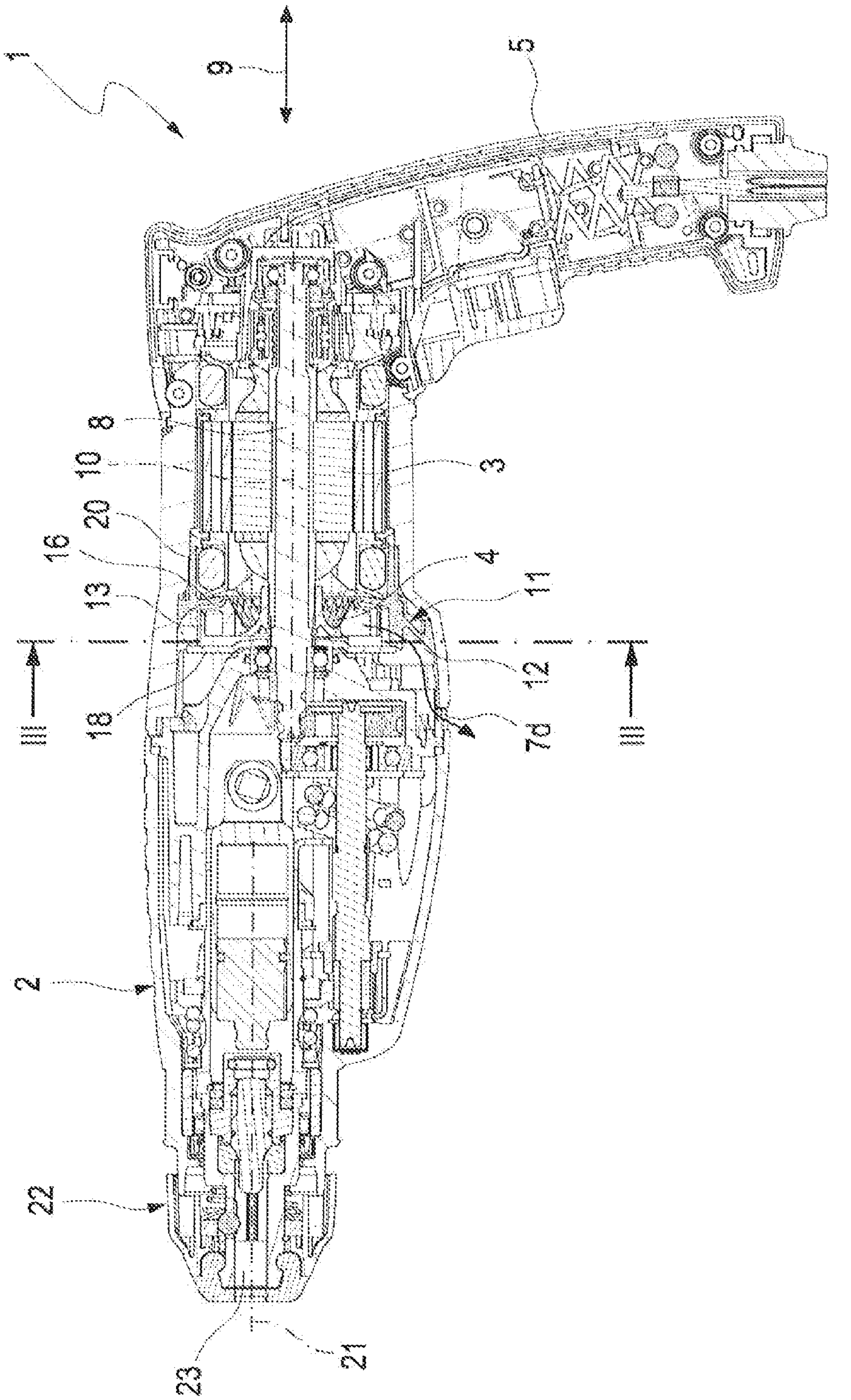
FIG. 2 is a lengthwise section of the electrical tool.
Figure 3:
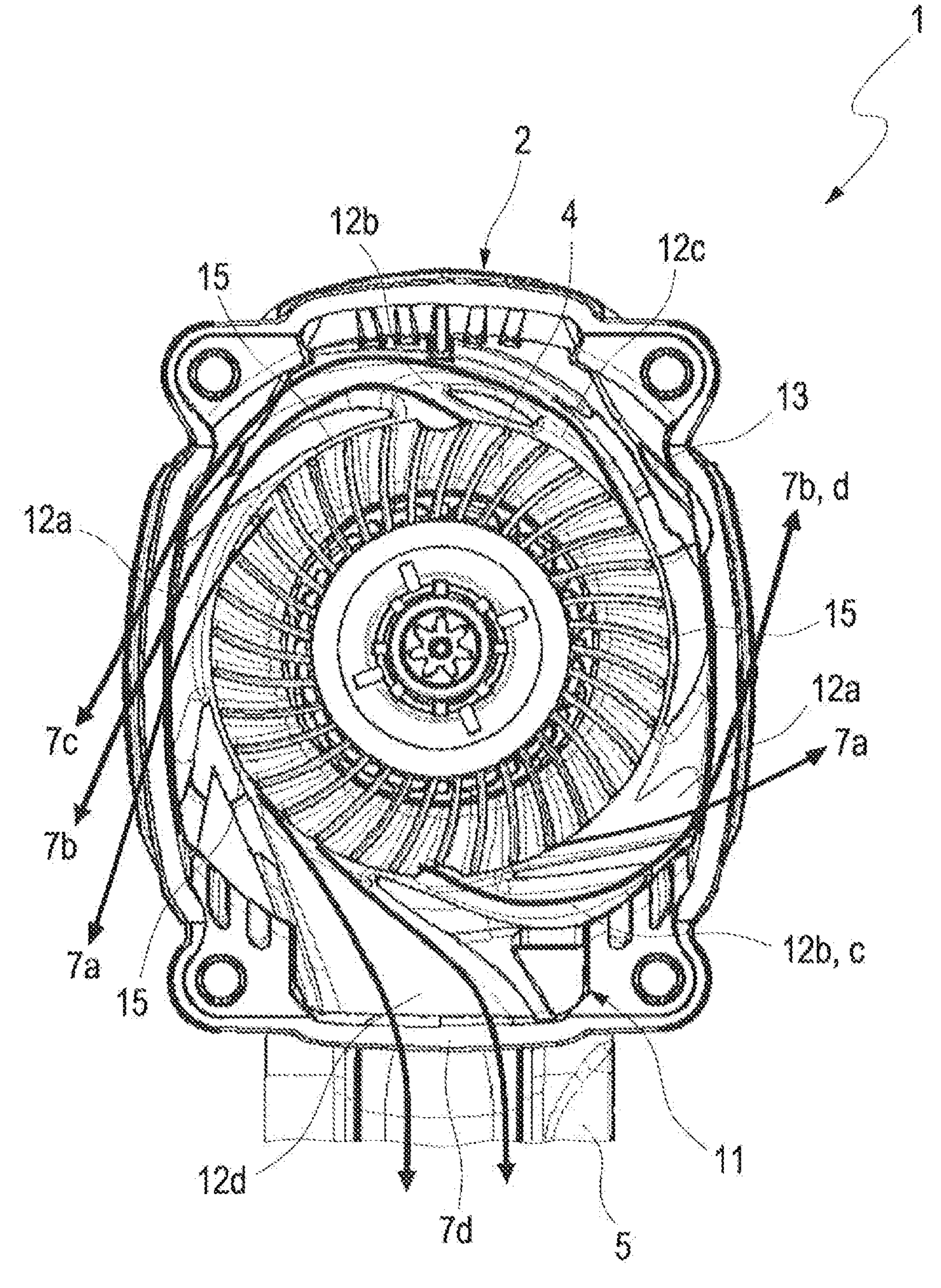
FIG. 3 is a cross section of the electrical tool along section lines III in FIG. 2.
Figure 5:
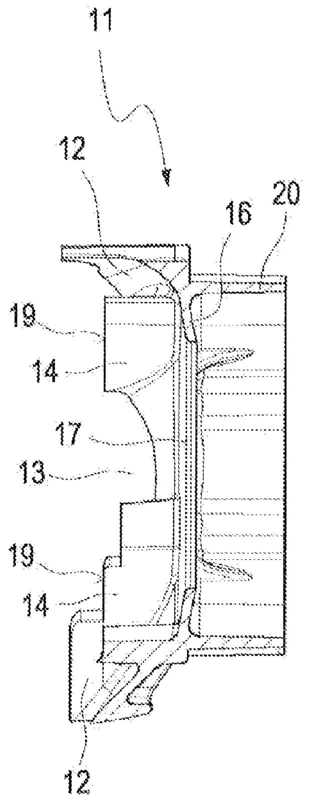
FIG. 5 is a lengthwise section of the air guide baffle ring along section lines V in FIG. 4.

As shown in FIGS. 1 to 3, an electrical tool 1 includes a housing 2, in which an electric motor 3 and a fan wheel 4 are disposed. The tool is preferably a manually operated electrical tool, for which purpose its housing 2 is equipped with a handle 5. In the example, electrical tool 1 has the form of a hammer drill. It is also possible that the electrical tool may be a drill or saw, a grinder, a milling machine or similar.

Housing 2 is furnished with at least one air inlet aperture 6, through which the air surrounding the electrical tool is able to enter the interior of housing 2. In the example, three slot-like air inlet apertures 6 are shown on the side facing the viewer in FIG. 1. Of course, similar air inlet apertures 6 may also be present on the side facing away from the viewer. The positions and/or number of air inlet apertures 6 may also differ from those shown in the illustration. Housing 2 is also furnished with at least one air outlet aperture 7. In the example, several air outlet apertures 7 are shown, in this case three slot-shaped air outlet apertures 7*a*, 7*b*, 7*c*, which in FIG. 1 are located on a side of housing 2 facing the viewer. In this case too, of course, corresponding air outlet apertures 7*a*, 7*b* and 7*c* may also be present on the side facing away from the viewer. As before, the position and/or number of air outlet apertures 7 may differ from those shown. In addition, a fourth air outlet aperture 7*d* is provided, and in FIGS. 1 to 3 is located on an underside of housing 2. It should be noted that air outlet apertures 7 and air inlet apertures 6 are disposed on different sides of electric motor 3 and fan wheel 4. With respect to a cooling air flow that is generated inside housing 2 by air inlet apertures 6 and extends to air outlet apertures 7, air inlet apertures 6 are located upstream of electric motor 3, while air outlet apertures 7 are located downstream thereof. The air returns to the atmosphere from housing 2 through air outlet apertures 7.

Fan wheel 4 is connected in torque-proof manner to a drive shaft 8 of electric motor 3. When electrical tool 1 is operating, fan wheel 4 is thus forced to rotate together with drive shaft 8. This causes fan wheel 4 to impel the air, that is to say fan wheel 4 sucks ambient air in through air inlet apertures 6 and expels it out of housing 2 through air outlet apertures 7. As a result, the desired cooling air flow is created inside housing 2 to cool electric motor 3 and in particular may also be used to cool other components of electric tool 1. For example, the cooling air flow may also be used to cool a gearbox, which is not shown in detail here, or a bearing for drive shaft 8, which bearing is also not shown. Electronic components of electric tool 1, which are also not shown in detail here, might also be cooled actively.

First air outlet aperture 7*a* is positioned approximately level with fan wheel 4 with reference to an axial line 9 that is defined by an axis of rotation 10 of drive shaft 8 extending parallel thereto. All other air outlet apertures 7 are arranged with axial separation from fan wheel 4 on axial line 9. Thus, second air outlet aperture 7*b* is axially distant from first air outlet aperture 7*a*, and accordingly is axially distant from fan wheel 4. Similarly, third air outlet aperture 7*c* is distant on axial line 9 from the first two air outlet apertures 7*a* and 7*b*, and is thus yet more axially distant from fan wheel 4. In the example shown, fourth air outlet aperture 7*d* is positioned farthest from fan wheel 4. Of course, it is possible for more air outlet apertures 7 to be present and/or for them to be positioned differently. In particular, another air outlet aperture, not shown here, may also be provided on housing 2, close to a tool chuck 23 at the opposite end of the tool from handle 5, for example so that a part of the cooling air flow is able to pass completely through the gearbox referred to previously.

An air guide baffle ring 11 is located in housing 2. Air guide baffle ring 11 surrounds fan wheel 4 coaxially and includes at least one air duct 12. In the example, several air ducts 12 are conformed on air guide baffle ring 11, specifically one first air duct 12*a* for each first air outlet aperture 7, at least a second and third air duct 12*b* and 12*c* for the second and third air outlet apertures 7*b* and 7*c*, and a fourth air duct 12*d* for the fourth air outlet aperture 7*d*. Air ducts 12 thus direct the air from fan wheel 4 to air outlet apertures 7. In the example, second air duct 12*b* and third air duct 12*c* converge or join on both sides of tool 1 to lead to second and third air outlet aperture 7*b, c* as common air duct 12*b, c* on the respective side of the tool. At least one of the air ducts 12, in this case the second, third and fourth air ducts 12*b, c, d*, direct the air from fan wheel 4 to air outlet apertures 7 that are axially distant from fan wheel 4, that is to say to the second, third and fourth air outlet apertures 7*b, c, d*. In the example, at least one air duct 12, specifically the first two air ducts 12*a*, are constructed so as to lead to at least one air outlet aperture 7, specifically to the first two air outlet apertures 7*a*, which is/are located on axial line 9 close to fan wheel 4.

In the example shown, air guide baffle ring 11 also includes several air ducts 12 leading to air outlet apertures 7 that are axially offset relative to each other. As was explained, at least three or four air ducts 12 are allocated to the four air outlet apertures 7*a, b, c, d* axially offset relative to each other and lead to these axially offset air outlet apertures 7.

Figure 4:
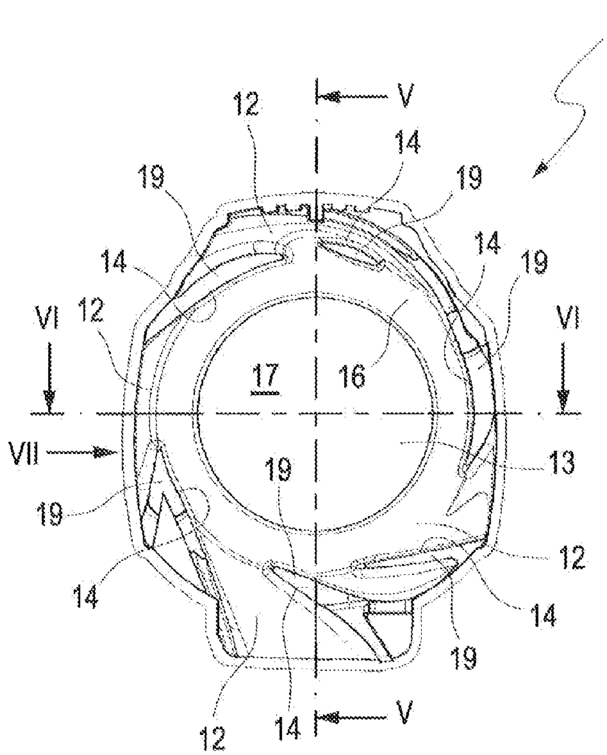
FIG. 4 is a front view of an air guide baffle ring.
Figure 6:
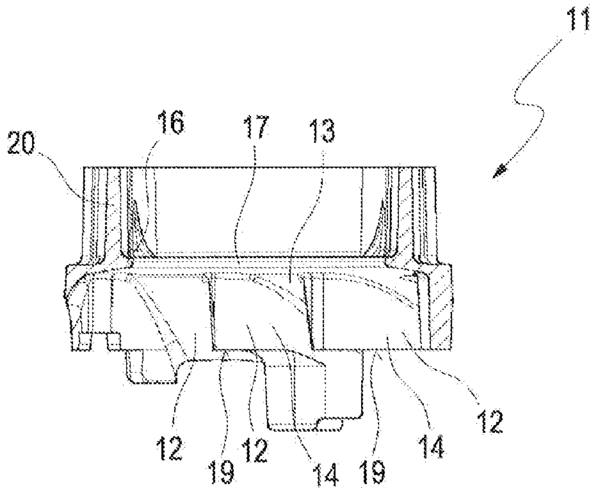
FIG. 6 is a lengthwise section of the air guide baffle ring along section lines VI in FIG. 4.
Figure 7:
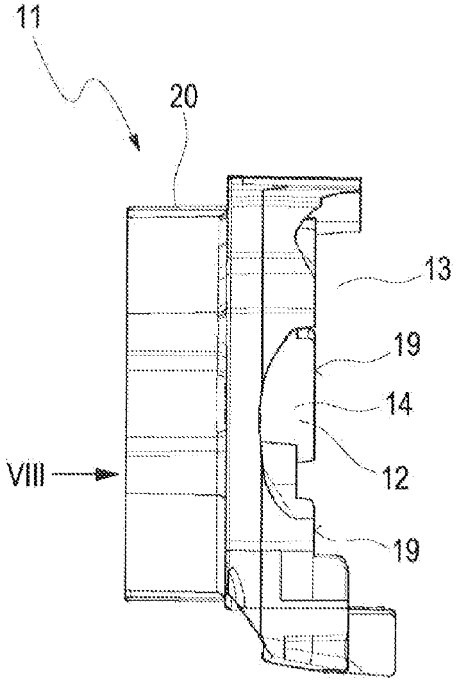
FIG. 7 is a side view of the air guide baffle ring corresponding to a viewing direction VII in FIG. 4.
Figure 8:
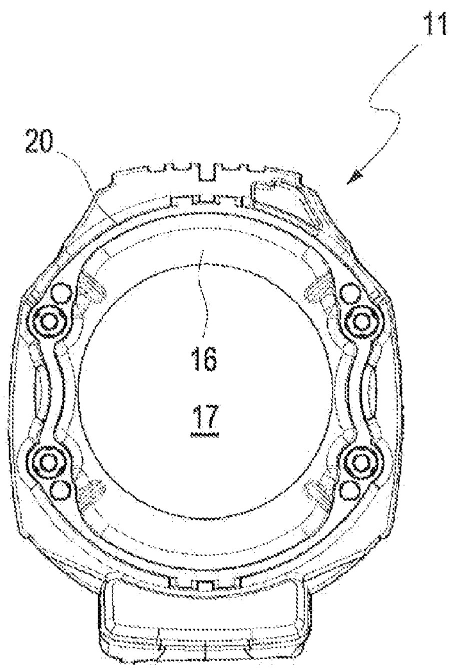
FIG. 8 is a rear view of the air guide baffle ring.
Figure 9:
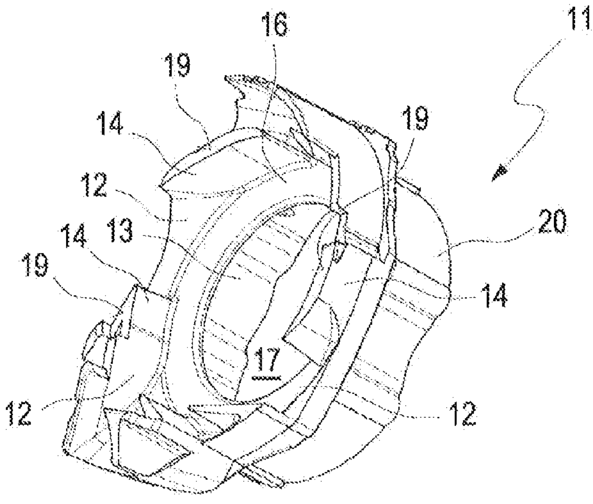
FIG. 9 is a perspective view of the air guide baffle ring.

As shown in FIGS. 3 and 4, each air duct 12 has a tangential inlet area, not shown in detail, located radially towards the centre on a side facing towards fan wheel 4, and a radially aligned outlet area, not shown in detail, located radially towards the periphery on a side facing the respective air outlet aperture 7.

As shown in FIG. 2 and also in FIGS. 4 to 9, air guide baffle ring 11 shown here has a contour, not shown in detail here, that is conformed to match the inner contour of housing 2 in the area of fan wheel 4 and in the area of air guide baffle ring 11. In this way, air guide baffle ring 11 is able to be integrated in housing 2 with very little space requirement.

As shown in FIGS. 2 to 9, air guide baffle ring 11 coaxially encloses a fan wheel space 13. Fan wheel 4 is located in this fan wheel space 13. Air ducts 12 also communicate with this fan wheel space 13 on the inlet side. Air guide baffle ring 11 has multiple wall sections 14 that delimit fan wheel space 13 radially, and each of which delimits a circumferential segment of fan wheel space 13. Wall sections 14 may be constructed as cylinder segments or may include at least one section having an interior in the shape of a cylinder segment. As shown in FIG. 3, a relatively narrow radial gap 15 may be formed between wall sections 14 and fan wheel 4, which prevents air from flowing radially outwards. The inlet areas of the various air ducts 12 are located between adjacent wall sections 14.

Air guide baffle ring 11 also has an annular base 16 that is arranged coaxially with axis of rotation 10 and encloses a central inlet 17 in air guide baffle ring 11. In addition, base 16 at least partly overlaps fan wheel 4 in the radial direction, as may be seen in FIG. 2. Central inlet 17 communicates with fan wheel space 13. It faces towards the axial intake side of fan wheel 4, whereas wall sections 14 face towards the radial pressure side of fan wheel 4. Air is drawn from housing 2 through inlet 17, which also causes air to be drawn from the outside, through air inlet apertures 6 via the internal cooling air path. Base 16 blocks or prevents the air from flowing back from the pressure side of fan wheel 4 to its inlet side. As is shown in the example of FIG. 2, a cap 18 is also provided to serve as the axial limit to fan wheel space 13 on the side facing away from base 16. This cap 18 is advantageously a part that is manufactured separately from air guide baffle ring 11. It has a central aperture, not further shown here, through which drive shaft 8 passes. Cap 18 ensures that the air propelled by fan wheel 4 flows from the pressure side through air ducts 12 and does not first pass axially into housing 2. In this way, cap 18 assists with guiding the air deliberately through air ducts 12, and also serves to reduce downstream side air resistance. Cap 18 rests axially flush with bearing surfaces 19 that are provided on the frontal face of air guide baffle ring 11. These bearing surfaces 19 are conformed on free frontal face ends of wall sections 14. Wall sections 14 serve as the radially inward limit for fan wheel space 13. They may also be extended into air ducts 12 to form an inner and/or outer lateral limit for at least one of the air ducts 12.

As shown in FIG. 2 and also in FIGS. 4 to 9, air guide baffle ring 11 is also equipped with an annular collar 20 that protrudes axially on a side facing away from fan wheel 4 and partially overlaps electric motor 3 axially as shown in FIG. 2. This serves to channel and direct the cooling air path towards central inlet 17. In the example, axis of rotation 10 of electric motor 3 in electrical tool 1 is aligned parallel to an axis of rotation 21 of a tool spindle 22 of electrical tool 1. In all cases, the construction may also be angularly offset. The axial separation between the air outlet apertures 7 at a distance from fan wheel 4 may be for example equal to and up to four times greater or at least four times greater than an axial height of fan wheel 4.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An electrical tool comprising:

an electric motor (3);

a fan wheel (4) that is connected in torque-proof manner to a drive shaft (8) of the electric motor (3) and that rotates about an axis of rotation (10);

a housing (2) that accommodates the electric motor (3) and the fan wheel (4), the housing having a surface substantially parallel to the axis of rotation (10) that includes at least one air inlet aperture (6) and a plurality of air outlet apertures (7), wherein at least one of the plurality of air outlet apertures (7) is arranged axially spaced apart from an axial position of the fan wheel (4) on the drive shaft (8); and an air guide baffle ring (11) arranged in the housing (2) encloses the fan wheel (4) coaxially and has a plurality of air ducts (12) which lead to a corresponding one of the plurality of outlet apertures (7) located axially a distance from the fan wheel (4), wherein at least one of the plurality of air ducts extends axially and radially outward of any of the other plurality of air ducts.

2. The electrical tool as recited in claim 1, including multiple air outlet apertures (7), and wherein the air guide baffle ring (11) is furnished with multiple air ducts (12) which lead to different air outlet apertures (7).

3. The electrical tool as recited in claim 1, including at least one additional air outlet aperture (7*a*) that is arranged in the axial area of the fan wheel (4), wherein the air guide baffle ring (11) is also provided with at least one air duct (12*a*) that leads to this at least one extra air outlet aperture (7*a*).

4. The electrical tool as recited in claim 1, including multiple air outlet apertures (7) that are axially offset with respect to each other, wherein the air guide baffle ring (11) has multiple air ducts (12) that lead to the axially air outlet apertures (7) that are axially offset with respect to each other.

5. The electrical tool as recited in claim 1, wherein the respective air duct (12) has a tangential inlet area and a radial outlet area.

6. The electrical tool as recited in claim 1, wherein an outer contour of the air guide baffle ring (11) is designed to complement an inner contour of the housing (2) in the area of the air guide baffle ring (11).

7. The electric tool as recited in claim 1, wherein the air guide baffle ring (11) coaxially encloses a fan wheel space (13) in which the fan wheel (4) is located and with which the respective air duct (12) communicates on the inlet side.

8. The electric tool as recited in claim 7, wherein the air guide baffle ring (11) has an annular base (16) enclosing a central inlet (17) that communicates with the fan wheel space (13) and at least partially overlaps the fan wheel (4) radially.

9. The electric tool as recited in claim 8, including a cap (18) that delimits the fan wheel space (13) axially.

10. The electrical tool as recited in claim 9, wherein the cap (18) is axially flush with bearing surfaces (19) that are conformed on frontal face ends of the fan wheel space (13) and/or wall sections (14) that laterally delimit the at least one air duct (12).

11. The electric tool as recited in claim 10, wherein the at least one of the plurality of air ducts that extends axially and radially outward of any of the other plurality of air ducts extends axially forward of the cap.

12. The electrical tool as recited in claim 9, wherein the cap (18) delimits the fan wheel space (13) axially on a side faced axially away from the annular base (16).

13. The electrical tool as recited in claim 1, wherein the air guide baffle ring (11) has an axially protruding annular collar (20) on a side facing away from the fan wheel (4), which collar at least partially overlaps the electric motor (3) axially.

14. The electrical tool as recited in claim 1, wherein the electrical tool (1) is a drill or hammer drill.

15. The electrical tool as recited in claim 1, wherein the air guide baffle ring (11) is installed inside the housing (2).

16. The electric tool as recited in claim 1, wherein the at least one of the plurality of air ducts that extends axially and radially outward of any of the other plurality of air ducts extends from a bottom of the air guide baffle ring.

17. The electric tool as recited in claim 1, including a bottom air outlet aperture defined by the housing that directs air out a bottom side of the housing and the at least one of the plurality of air ducts that extends axially and radially outward of any of the other plurality of air ducts to direct air through the bottom air outlet aperture.

* * * * *